United States Patent
Wang et al.

(10) Patent No.: US 8,671,074 B2
(45) Date of Patent: Mar. 11, 2014

(54) LOGICAL REPLICATION IN CLUSTERED DATABASE SYSTEM WITH ADAPTIVE CLONING

(75) Inventors: Rui Wang, Redmond, WA (US); Michael E. Habben, Sammamish, WA (US); Qun Guo, Bellevue, WA (US); Peter Byrne, Bellevue, WA (US); Robin D. Dhamankar, Bellevue, WA (US); Vishal Kathuria, Woodinville, WA (US); Mahesh K. Sreenivas, Sammamish, WA (US); Yixue Zhu, Sammamish, WA (US); Xiaowei Jiang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 210 days.

(21) Appl. No.: 12/758,045

(22) Filed: Apr. 12, 2010

(65) Prior Publication Data

US 2011/0251997 A1  Oct. 13, 2011

(51) Int. Cl.
*G06F 17/30* (2006.01)
(52) U.S. Cl.
USPC ......................................................... 707/634
(58) Field of Classification Search
USPC ......................................................... 707/634
See application file for complete search history.

(56) References Cited

U.S. PATENT DOCUMENTS

| | | | |
|---|---|---|---|
| 5,287,501 A | 2/1994 | Lomet | |
| 5,469,562 A | 11/1995 | Saether | |
| 5,787,247 A | 7/1998 | Norin et al. | |
| 5,991,771 A | 11/1999 | Falls et al. | |
| 6,226,650 B1 | 5/2001 | Mahajan et al. | |
| 6,438,705 B1 | 8/2002 | Chao et al. | |
| 6,567,823 B1 | 5/2003 | Rothchild | |
| 6,671,686 B2 | 12/2003 | Pardon et al. | |
| 6,732,124 B1 | 5/2004 | Koseki et al. | |
| 7,076,508 B2 | 7/2006 | Bourbonnais et al. | |
| 7,099,897 B2 | 8/2006 | Huras et al. | |
| 7,257,690 B1 | 8/2007 | Baird | |
| 7,487,160 B2 | 2/2009 | Whyte | |

(Continued)

OTHER PUBLICATIONS

Cecchet, et al., "Middleware-based Database Replication: The Gaps between Theory and Practice", Retrieved at << http://infoscience.epfl.ch/record/118488/files/fp462-cecchet.pdf?version=1 >>, International Conference on Management of Data, Proceedings of the 2008 ACM SIGMOD international conference on Management of data, Jun. 9-12, 2008.

(Continued)

*Primary Examiner* — Rehana Perveen
*Assistant Examiner* — Alexander Khong
(74) *Attorney, Agent, or Firm* — Nicholas Chen; Kate Drakos; Micky Minhas

(57) ABSTRACT

Architecture that addresses an end-to-end solution for logical transactional replication from a shared-nothing clustered database management system, which uses adaptive cloning for high availability. This can be time based using a global logical timestamp. The disclosed architecture, used for refreshing stale clones, does not preserve user transaction boundaries, which is a more complex situation than where the boundaries are preserved. In such a scenario it is probable that for a given data segment no clone of the segment may contain the complete user transaction history, and hence, the history has to be pieced together from the logs of multiple different clones. This is accomplished such that log harvesting is coordinated with the clone state transitions to ensure the correctness of logical replication.

19 Claims, 7 Drawing Sheets

(56) References Cited

U.S. PATENT DOCUMENTS

| | | | |
|---|---|---|---|
| 7,490,113 | B2 | 2/2009 | Bourbonnais et al. |
| 7,801,846 | B2 | 9/2010 | Devine et al. |
| 8,078,582 | B2 | 12/2011 | Wang |
| 8,108,343 | B2 | 1/2012 | Wang |
| 8,266,101 | B1 * | 9/2012 | Shuai ............... 707/610 |
| 2002/0073285 | A1 | 6/2002 | Butterworth |
| 2002/0120791 | A1 | 8/2002 | Somalwar et al. |
| 2004/0260719 | A1 | 12/2004 | Giraud-Sauveur et al. |
| 2005/0010588 | A1 | 1/2005 | Zalewski et al. |
| 2005/0193035 | A1 | 9/2005 | Byrne |
| 2005/0283658 | A1 | 12/2005 | Clark et al. |
| 2006/0090095 | A1 | 4/2006 | Massa et al. |
| 2006/0218206 | A1 * | 9/2006 | Bourbonnais et al. ........ 707/202 |
| 2007/0078911 | A1 * | 4/2007 | Lee et al. ............. 707/204 |
| 2008/0027987 | A1 | 1/2008 | Arora et al. |
| 2008/0133623 | A1 | 6/2008 | Tsuchida et al. |
| 2008/0140734 | A1 * | 6/2008 | Wagner ............... 707/202 |
| 2008/0189239 | A1 | 8/2008 | Bawa et al. |
| 2008/0243769 | A1 | 10/2008 | Arbour et al. |
| 2008/0306907 | A1 | 12/2008 | Biswal et al. |
| 2009/0217274 | A1 | 8/2009 | Corbin et al. |
| 2009/0235232 | A1 | 9/2009 | Malik et al. |
| 2009/0248727 | A1 | 10/2009 | Hughes |
| 2011/0099146 | A1 * | 4/2011 | McAlister et al. ............ 707/634 |

OTHER PUBLICATIONS

Lightstone, et al., "Toward Autonomic Computing with DB2 Universal Database", Retrieved at << http://www.sigmod.org/record/issues/0209/lensilegman2.pdf >>, ACM SIGMOD Record, vol. 31, No. 3, Sep. 2002.

Torbjørnsen, Øystein., "Multi-site Declustering Strategies for Very High Database Service Availability", Retrieved at << http://www.idi.ntnu.no/grupper/su/publ/phd/thorbjornsen-thesis.pdf >>, NTH, IDT Report 1995:3, ISSN 0802-6394, Jun. 22, 1995.

"The Adaptive Server® Enterprise Guide to TechWave", Retrieved at << http://m.sybase.com/files/Product_Overviews/Sybase_TW08_ASE_Guide.pdf >>, TechWave, Sybase user training & solutions conference, Aug. 4-8, 2008.

"Performance and Clusters", Retrieved at << http://searchexchange.techtarget.com/searchExchange/downloads/Redmond_Ch08.pdf >>, Retrieved Date: Jan. 21, 2010.

Nishimoto Michael, "The Log Manager (xLM)", Retrieved at <<http://oss.sgi.com/projects/xfs/design_docs/xfsdocs93_pdf/log_mgr.pdf>>, Silicon Graphics Proprietary, Mar. 28, 1994, pp. 1-10.

Tsien, et al., "Logminer, Flashback Query and Online Redefinition: Power Tools for DBAS", Retrieved at <<http://www.oracle.com/technology/deploy/availability/pdf/32494_OW2002_WP.pdf>>, Oracle9i Database, Paper No. 32494, 2002, pp. 12.

Hupfeld, Felix, Log-Structured Storage for Efficient Weakly-Connected Replication, Retrieved at <<http://www.storagebox.org/private/felix/hupfeld-log_structured_storage_for_efficient_replication.pdf>>, Mar. 2004, pp. 6.

"EnterpriseDB Replication", Retrieved at <<http://docs.huihoo.com/enterpriseb/8.1/edb-replication.html>>, Feb. 27, 2009, pp. 19.

"Oracle Advanced Compression", Retrieved at <<http://www.oracle.com/technology/products/database/oracle11g/pdf/advanced-compression-whitepaper.pdf>>, An Oracle White Paper, Apr. 2008, pp. 13.

U.S. Appl. No. 12/428,495, Non-Final Office Action, mailed Apr. 11, 2011, 18 pages.

U.S. Appl. No. 12/428,495, Response to Non-Final Office Action mailed Apr. 11, 2011, filed Jun. 13, 2011, 19 pages.

U.S. Appl. No. 12/428,495, Final Office Action, mailed Jul. 22, 2011, 25 pages.

U.S. Appl. No. 12/428,495, RCE-Response to Final Office Action mailed Jul. 22, 2011, filed Sep. 7, 2011, 20 pages.

U.S. Appl. No. 12/428,495, Notice of Allowance mailed Nov. 30, 2011, 12 pages.

U.S. Appl. No. 12/418,635, Non-Final Office Action mailed May 5, 2011,.

U.S. Appl. No. 12/418,635, Response to Non-Final Office Action mailed May 5, 2011, filed Aug. 5, 2011,.

U.S. Appl. No. 12/418,635, Notice of Allowance mailed Sep. 23, 2011, 18 pages.

U.S. Appl. No. 12/418,635, Amendment after Notice of Allowance mailed Sep. 23, 2011, filed Oct. 14, 2011, 7 pages.

U.S. Appl. No. 12/418,635, Response-Rule 312 to Amendment filed Oct. 14, 2011, mailed Nov. 3, 2011, 3 pages.

\* cited by examiner

*300

| GLOBAL VALUE | BRICK B1 | BRICK B2 | BRICK B3 |
|---|---|---|---|
| 0...N-1 | Initial activity in pk_tab_c1 | All activity in pk_tab_c1 is propagated to pk_tab_c2 | ... |
| N | | B2 goes offline; hence, pk_tab_c2 is offline | ... |
| N+1 | Begin Transaction T1; insert (p1, s1, v1) in pk_tab_c1 ; (1) commit Transaction T1 | pk_tab_c2 misses this update and becomes stale | ... |
| N+2 | | | Begin Transaction T1; insert (fp2, p1) into fk_tab ; (2) commit Transaction T1 |
| N+3 | | Brick B2 rejoins the system. Refresh for the clone pk_tab_c2 starts. | ... |
| N+4 | | Begin transaction Clone_Refresh; insert (p1, s1, v1) in pk_tab_c2; commit transaction Clone_Refresh | ... |
| N+5 | | pk_tab_c2 is online | ... |

*FIG. 3*

LOGICAL REPLICATION IN CLUSTERED DATABASE SYSTEM WITH ADAPTIVE CLONING

BACKGROUND

In an effort to make database management systems more scalable, multiple server processes can be clustered in such a way that together they function as a single logical system. Databases may be hosted on multiple nodes (servers), each of which hosts zero or more segments of the database. To distribute the data, an object (e.g. table or an index on the table) can be logically sub-divided into data segments. Physical manifestation of a data segment is called a clone. Thus, by dividing an entity (e.g. table, index) into one or more logical data segments and distributing the data corresponding to the logical segments (clones) across various nodes, scalability for the system can be achieved. While doing so, in order to make the data highly available and the system as a whole more fault-tolerant, multiple redundant copies of the data (multiple clones for each data segment) may be maintained. When nodes move between online and offline states due to failure or intentional administrative purposes, these clones can become stale due to updates that occur while the clones are offline (inaccessible).

Disaster Recovery (DR) is a key requirement for enterprise-class database systems. Facilitating disaster recovery typically involves maintaining up-to-date copies of databases at multiple locations that are separated geographically. One rudimentary approach to replicate a database distributed on multiple nodes to a remote site is to shutdown the database and copy data associated with the database onto the remote site, thereby making more efficient and effective techniques for disaster recovery desirable. Although this technique is able to provide a consistent image of the database to the remote site, it involves database downtime. Depending on the size of the database, this process is time consuming, inefficient, resource intensive, and incurs data loss most of the time. Moreover, taking a database offline, even for short periods of time, can be prohibitively costly and problematic. Thus, more effective and efficient replication strategies are desired for disaster recovery.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture addresses an end-to-end solution for logical transactional replication in a shared-nothing (SN) clustered database management system, which uses adaptive cloning for high availability. Logical replication can be established between two databases associated with two different database management systems. Since at the logical level, replication is agnostic to how the data is stored on the source and the target. Thus, the source can be the shared-nothing cluster and the target can be a standalone (non-clustered) instance. The logical replication can be time based using a global logical timestamp.

Cloning is the process of maintaining redundant copies of data within the cluster. Cloning can employ a primary clone and one or more secondary clones. Adaptive cloning means that when a primary clone becomes unavailable (e.g., due to server failure/shutdown) an up-to-date secondary clone is switched online to become the primary clone. Since this switching is typically a very fast operation, availability of data is not compromised. In addition clones can be split and/or merged to dynamically load balance the system.

The disclosed architecture, used for refreshing stale clones, does not preserve user transaction boundaries, which is a more complex situation than where the boundaries are preserved. In such a scenario it is probable that for a given data segment no clone of the data segment may contain the complete user transaction history, and hence, the history has to be pieced together from the logs of multiple different clones. This is accomplished such that log harvesting is coordinated with the clone state transitions to ensure the correctness of logical replication.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 3 illustrates a time and activity table with respect to harvesting multiple log streams in the presence of adaptive cloning.

DETAILED DESCRIPTION

Figure 1:
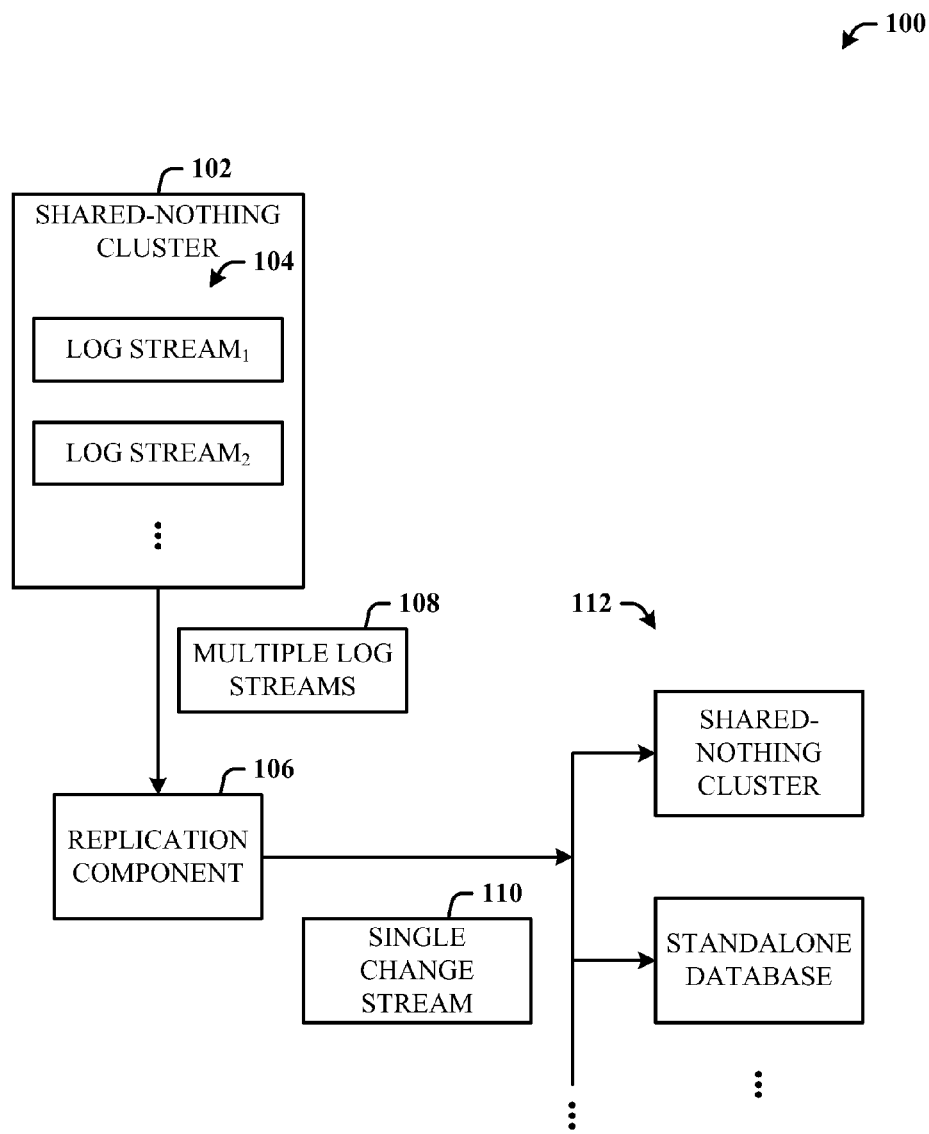
FIG. 1 illustrates computer-implemented database management system in accordance with the disclosed architecture.

The disclosed architecture addresses the problem of logical transactional replication from a shared-nothing (SN) clustered database management system that employs adaptive cloning for high availability of the database. An architectural goal is to provide a single system image. Each node (server or brick) in the SN cluster operates autonomously. That is, each node has sole ownership of the data on that node. There is no node that shares data with another node in the cluster. When utilizing multiple servers in the cluster, the data is divided across the multiple servers. For example, if the data on a single server comprises users, orders, and products, the SN cluster approach employs three separate machines for partitioning the data—a first node hosting users data, a second node hosting orders data, and a third node hosting products data. Moreover, data can be partitioned horizontally across the cluster nodes.

The database management system can be a cluster system that comprises a collection of servers or instances. An instance of the server linked together with the necessary cluster infrastructure is referred to as a brick (also a node). Thus, the cluster is a collection of one or more bricks (also referred to as nodes). Data is distributed across multiple bricks in the system to achieve scale-out and performance. A database object, such as a table or index, is divided into segments. Segments are logical entities. The physical manifestation of a data segment is referred to as a clone. Each data segment has one or more clones associated with it—typically more than one, to provide high availability of the data. Clones are transactionally consistent redundant copies of data maintained in an up-to-date state and managed by the database management system that enables a higher degree of availability, dynamic load balancing, fault tolerance, and other designated purposes. Clones have roles—primary and secondary. One and only one clone of each data segment is assigned the primary role. Other redundant clones of a given data segment are assigned the secondary role.

When a brick goes offline (e.g., due to a failure or intentional shutdown triggered by the user/administrator) all the clones physically hosted on that brick go to offline state. Offline clones are inaccessible, and hence, updates do not get propagated while the clones remain inaccessible. A clone that misses one or more updates becomes stale. Stale clones need to be refreshed to an up-to-date state when the brick on which the stale clone is physically located comes back online (rejoins). Note that the brick can be online while the stale clone is offline so that stale clone needs to be refreshed to an up-to-date state when the brick hosting the stale clone comes back online (stale clone becomes accessible again). Updates can complete successfully as long as at least the primary clone(s) of the data segment(s) is available. (Some distributed systems require a quorum of clones.) Updates to each segment get applied on the primary clone and then propagated from the primary clone to the corresponding secondary clones within the same transaction. A primary clone can never be in the stale state. When the brick rejoins, the clones on that brick become accessible again.

The process of bringing a stale clone back to transactional consistency with a primary clone is called clone refresh. Clone refresh is not accomplished by replaying the associated transaction log(missed updates). Rather, the system adopts a technique that identifies mismatches in the stale clones and updates those records in no particular order and without preserving the user transaction boundaries. Such algorithms do not typically suffer from the problem of having long catch-up phases.

However, a system using such a scheme for clone refresh can get into a state where for a given segment of data, no clone of the segment contains the full user transaction history in the associated log. This makes logical replication a more complex task, especially where transaction boundaries are not preserved. As is described in greater detail herein, the solution is to coordinate clone state transition with log harvesting to ensure the correctness of logical replication.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates computer-implemented database management system 100 in accordance with the disclosed architecture. The system 100 includes a shared-nothing cluster 102 that employs adaptive cloning to store database segments of a database across cluster nodes. Each database segment is associated with transaction log records that track changes of a transaction. The transaction log records can be formed into a transaction log stream. Thus, the cluster 102 can include multiple log streams 104 of changes that occur for the clones on the cluster nodes. A replication component 106 receives a set of the multiple transaction log streams 108 of a database to create a change history of the changes. The replication component 106 merges the set of multiple log streams into a single change stream 110 and then logically replicates the changes to one or more destination data system(s) 112 as a single stream of changes.

The replication component 106 maintains an original data operation order of the changes when receiving the multiple transaction log records of different transactions. The replication component 106 adheres to an original data change order of transaction log records within a transaction generated in the multiple transaction log streams. The replication component 106 receives the multiple transaction log records based on global logical timestamps of commit processes employed in the cluster.

The replication component 106 creates the change history as a single ordered stream of the changes, and the single ordered stream created from the multiple transaction log streams, where each log stream is potentially incomplete (lacks a complete record of all the changes).

Figure 2:
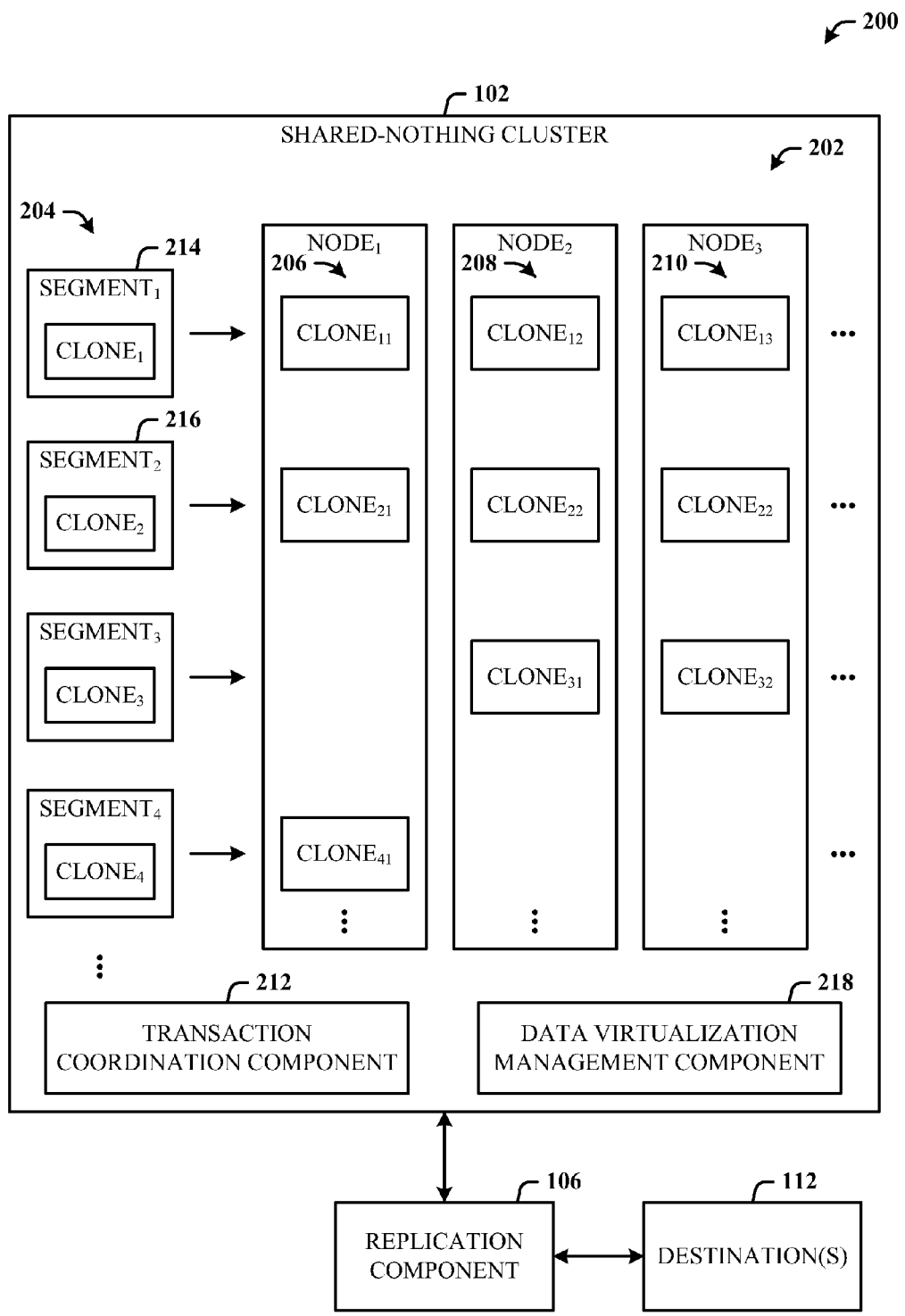
FIG. 2 illustrates additional details of a database management system.

FIG. 2 illustrates additional details of a database management system 200. The system 200 includes the shared-nothing cluster 102 of nodes 202 that employs adaptive cloning to store data segments 204 as clones (206, 208, and 210) on the nodes 202. A transaction coordination component 212 coordinates distributed transaction processing of multiple transaction log records in association with changes to the clones (206, 208, and 210). Each of the data segments 204 is cloned across some of the nodes 202. For example, a first segment 214 is associated with a $Clone_1$ that is distributed to nodes in the cluster 102. Similarly, a second segment 216 is associated with a $Clone_2$ that is distributed to nodes in the cluster 102, and so on for other segments and clones as shown. When a node goes offline it may or may not affect all clones of a data segment or other data segments.

The replication component 106 harvests the transaction log records from cluster nodes 202 as log streams. A data virtualization management component 218 is responsible for clone state transitions, clone placement, dynamic load balancing, etc.

The transaction coordination component 212 can function as a distributed transaction coordination manager that, among other functions and operations, receives a commit request, receives transaction orders from the nodes, and broadcasts a global logical timestamp to the nodes to commit the transactions.

The global logical timestamp value is a monotonically increasing value. Each commit/abort broadcast from the transaction coordination manager results in an increase in the global logical timestamp value. Individual transactions are associated with a commit-global logical timestamp value that corresponds to the global logical timestamp message in which the commit decision was hardened and broadcast. The commit-global logical timestamp value represents the logical time associated with the transaction commit. Given two transactions that committed in different global logical timestamp values, the transaction associated with a lower commit-global logical timestamp value is said to have committed earlier. The global logical timestamp mechanism therefore provides a global clock to partially order data modifications in the cluster.

Refreshing of a stale clone (as well as clone state transition) is performed by the data virtualization component 218, and starts with a transition to in-refresh state. Updates are propagated to in-refresh clones and selectively get applied depending on the phase in which the refresh operation is at (some updates on the in-refresh clone can be skipped/discarded if the ongoing refresh activity will catch up to it anyway). The clone is eligible to be designated the primary role when the refreshing process is completed.

As previously described, a primary clone can never be in a stale state. However, the primary and secondary role assignments can be changed. Stale clones are refreshed from the primary clone of the data segment. A decision can be made to rebuild the clone in its entirety from another source rather than refresh the clone, if the degree of staleness is above a predetermined threshold.

Specifically, each record has a key and a system-defined clone update identifier (CUID) column that is present in both primary and secondary clones. The CUID is used to detect if the record is up-to-date. Each table has a CUID "high watermark" value that is stored in metadata. Suitable data manipulation language operation(s) detect this CUID value, treat the value as a runtime constant, and update every row having the associated value.

More specifically, when a clone goes offline, the language operation that is accessing the clone will abort. The CUID high watermark value for the table is updated in metadata concurrently with marking in metadata that this clone should no longer be updated (in an offline state). Any new operation that starts will not update the offline secondary clones, and puts the new value of CUID in the rows the operation inserts or updates on the primary clone.

When a secondary clone is brought back online, the metadata is updated to indicate that this clone is now to be maintained by the language. This occurs by marking the beginning of transitioning process of the stale clone to in-refresh state. The operation that was already running continues to run without any changes, and is unaware of the new clone.

All new operations that start after this point pick up the new metadata (at query startup time, not compile time) when the schema locks on the table are obtained, and keeps the secondary clone up-to-date (updates propagated to secondary clones that are in in-refresh or online state). Inserts are propagated as long as there is no duplicate record. Updates and deletes are only propagated if the CUID column before update/delete compares successfully between the primary and secondary clone. That is, only update or delete operations are performed on the row in the secondary clone(s) if the clone is up-to-date; otherwise, ignore, and update/delete from primary. When all old operations have completed, metadata detects that the old metadata version is no longer in use, deletes the metadata, and sends notification that the clone is now officially in the in-refresh state.

At this point, a refresh algorithm runs and performs an outerjoin in a read committed mode, between the primary clone and secondary clone, finding the keys of the rows that may be out-of-date (in other words, the key is not present in both primary and secondary clone, or if the key is present in both clones but CUID values do not match). This set of keys is inserted into a temporary table. Because all new operations propagate to the secondary, the outerjoin is guaranteed to find all out-of-date rows; however, the operations may also find some rows that are actually consistent.

Next, a series of batch transactions are run in a repeatable read mode. The operations lock a set of keys on the primary clone, delete all those keys from the secondary clone, insert the data row from primary clone into the secondary clone, and commit the transaction. When the batch completes, the set of records is consistent, and will forever stay consistent because the language operations continually update the records. The process continues, making a single pass through the table. The secondary clone is up-to-date when the table pass completes.

An algorithm such as described herein attempts to avoid long catch-up (refreshing of a clone) typically associated with schemes similar to algorithms that playback transaction logs. However, updates involved in refreshing the clone do not preserve the original user transaction boundaries. Thus, over time it is possible to have data segments for which no single clone completely has the entire user transaction history in the associated log. A solution is to coordinate log harvesting with clone state transition.

The following description is a general summary of the lifetime of a distributed transaction in the SN clustered database. A user starts a distributed transaction. The brick on which the transaction is started is designated as the root brick of the transaction. The user then issues a query under this transaction. Part of the query needs to run in other bricks. As the query sends parts to other bricks, the transaction information is also sent. Separate transaction branches are setup in new bricks that are involved in the transaction. After the query is finished, the transaction branch stays in that brick until the transaction has been committed or rolled back.

After the remote brick finishes using the transaction for the current request, a summary of the activity of the transaction is sent back to a root transaction branch. The root branch tracks all the bricks that participated in the transaction and the time when the last transaction log record is written in each brick.

The user requests to commit the transaction through the root branch. As the root branch tracks all participating bricks and the work performed by the transaction in each of the participating bricks, it can determine when the transaction is prepared as soon as it has been ascertained that the relevant portions of the log have been persisted on each participant brick.

When a transaction is prepared, the root branch sends a commit request to the distributed transaction manager (coordination component 212). Each brick batches individual transaction commit requests locally and then sends the complete batch as a transaction order to the transaction manager. The distributed transaction manager collects the transaction orders from all bricks and groups the orders. At some predetermined time interval, the transaction manager sends out a global logical timestamp broadcast which includes all transaction orders collected during this interval. Each broadcast is associated with a monotonically increasing global logical timestamp. Only after the root brick receives this broadcast is the root transaction branch committed locally. Similarly, when the broadcast reaches remote participating bricks of the transactions, the remote footprints are cleaned up.

The locks held by the transaction branches are not released until commit has been processed, which occurs only after the transaction commit has been included in a broadcast. This ensures that two transactions that have data conflicts (operate on the same piece of data) are serialized and cannot commit with the same global timestamp.

A time-based scheme can be employed for the coordination and commit of distributed transactions. Each brick batches individual transaction commit requests locally and sends the complete batch as a transaction order to the transaction manager.

The distributed transaction coordination component 212 collects transaction orders from all bricks for a period of time and then groups the orders. At the end of the time period, the coordination component 212 broadcasts these commit/abort decisions for this group of transactions to all bricks in the cluster (after decisions have been persisted).

To assign a unique timestamp to this group, a global logical timestamp is associated with this group of transactions. The global logical timestamp can be a number that increases monotonically. Each commit/abort broadcast results in an increase in the global logical timestamp. Individual transactions are associated with a commit global logical timestamp corresponding to a group message in which the commit decision was hardened and broadcast. The commit global logical timestamp represents the logical time associated with the transaction commit. Given two transactions that committed in different commit global logical timestamps, the global logical timestamp associated with a lower commit global logical timestamp is said to have committed earlier. The global logical timestamp mechanism therefore provides a global logical timestamp to partially order data modifications in the cluster.

The order of replication of log records of dependent transactions across multiple log streams is maintained. The harvesting of log records of different transactions from the multiple log streams is maintained to keep the original operation order. This order is utilized to maintain logical consistency of data (e.g., foreign key relations). Consider the following schema as the running example:

```
CREATE TABLE pk_tab(
    pKey1 INT PRIMARY KEY,
    sKey1 INT, -- Non-clustered index on sKey
    value INT)
CREATE TABLE fk_tab(
    pKey2 INT PRIMARY KEY,
    sKey2 INT REFERENCES pk_tab1 (pKey1) ) -- FOREIGN KEY
``` where transaction T1 inserts a row (p1, s1, v1) into table pk_tab, and transaction T2 inserts a row (fp2, p1) into table fk_tab, and where p1 references the row inside pk_tab1.

In order for replication to be consistent, transaction T1 must be applied to subscribers before transaction T2. If the order is not maintained, there can be foreign key violations as changes are applied at the subscriber.

Due to the batched commit processing, transactions having data conflicts commit in different commit broadcasts. Replicating transactions in the order of the associated commit broadcast ensures that the replication preserves the order, and hence, the constraints.

The order of the replication of log records within a transaction generated in multiple log streams is followed. The log records within a transaction may be distributed in multiple logs. Log-based replication extracts data changes from multiple logs, and merges the data changes into a single data change stream. The original data change order within a transaction is followed when the data changes are applied to the remote database server; otherwise, data consistency can be violated.

Continuing with the example above, consider that the database includes two database segments, where a database is a collection of one or more database segments. Further, consider that pk_tab is located in dbsegment1 and fk_tab is located in dbsegment2. Consider the following transaction:

```
begin tranT
    insert a row (p1, s1, v1) into table pk_tab
    insert a row (fp2, p1) into table fk_tab
commit tran T
In dbsegment1 transaction log:
    begin-tran-Tx
    insert-row-(p1, s1, v1)
    commit-tran-Tx
In dbsegment2 transaction log:
    begin-tran-Tx
    insert-row-(fp2, p1)
    commit-tran-Tx
```

Although these logs can be harvested independently, the extracted changes, "insert row (p1, s1, v1) into table pk_tab" and "insert a row (fp2, p1) into table fk_tab" are applied in order; otherwise, the foreign key constraints in fk_tab will be violated.

Each transaction branch has a seed for command sequence identifiers. When a transaction's root branch starts, the root branch initializes the seed to one. At a transaction branch, after a new command sequence identifier value has been generated using the seed, the seed is incremented. When a transaction branch sends a data change request to another branch of the same transaction, the current seed of the source transaction branch is transmitted with the request. After a transaction branch receives a request with seed x2, its new seed becomes max(x1, x2), where x1 is its current seed. When a transaction branch sends a response, the current seed is transmitted as well. After a transaction branch receives a response, the recipient's seed is changed in the same way as above, that is, after a transaction branch receives a request with seed x2, its new seed will become max(x1, x2), where x1 is its current seed.

The rationale is if the relative order of two changes within a transaction is relevant for logical consistency, the change command sequence identifiers must be in the right order; otherwise, the two data changes within a transaction can occur in parallel in different database segments and the values of the command sequence identifiers is irrelevant. Command sequence identifier generation does not guarantee that all data changes within a transaction will be totally ordered; it merely guarantees partial ordering for logical consistency.

FIG. 3 illustrates a time and activity table 300 with respect to harvesting multiple log streams in the presence of adaptive cloning. As described above, clone refresh does not retain a complete transactional history of the updates when bringing stale clones up-to-date. Using the same schema as above, consider the following scenario between three log streams associated with three independent failure units:

Data segment pk_tab has clones pk_tab_c1 and pk_tab_c2 on brick B1 and B2, respectively; the clone on brick B1 is a primary clone and the clone of brick B2 is a secondary clone. Fk_tab's primary clone, fk_tab_c1, is on brick B3.

Log harvesting and applying (replicating) changes to the subscriber is performed in the order of the commit global logical timestamp of the associated transactions. Consider the following harvesting of the log for pk_tab:

Harvest the log from brick B1 for all changes to the data segment pk_tab up to global logical timestamp N−1 and harvest the remaining set of changes from brick B2 after the clone pk_tab_c2 has been brought online.

This order violates consistency. The two updates marked (1) at brick B1 and global logical timestamp N+1, and (2) at brick B3 and global logical timestamp N+2, are order dependent. Although, before clone pk_tab_c2 is brought online, the update in (1) has been applied by the clone refresh process;

this update has been marked in a transaction that committed after the dependent transaction that inserted a foreign key reference. If the log of brick B2 is harvested between global logical timestamps N and N+6, then during the application of the changes at the subscriber, foreign key constraint will be violated.

In general, log records generated during clone refresh are unsafe to harvest. Instead, only log records generated to online clones can be harvested. In order to ensure that consistent history of all user transactions is accounted for during log harvesting and application to the subscriber, clone refresh and clone switch to online state abide by the following constraint:

If a clone is brought to in-refresh state at global logical timestamp N and the refresh finishes at global logical timestamp N+x, the clone can be brought back to the online state only after the log reader has harvested log records for all global logical timestamps up to and including global logical timestamp N+x.

Consider that a table segment has two clones—one primary (online) and the other secondary in-refresh state, and right after the clone finishes refresh at global logical timestamp N+x, the brick hosting the primary clone goes offline. At this point, although the brick containing the clone just finishing refresh is ready to serve this table segment for users, its log records are unsafe for harvesting. Instead, the offline brick needs to be brought online and recovered first so that its log up to global logical timestamp N+x is available for harvesting. With the above constraint, it is guaranteed that as long as a table segment is online, its historic data changes are available from the logs of bricks that contain its online clones.

Put another way, a database management system is provided that performs replication of data from a shared-nothing cluster that employs adaptive cloning. The cluster stores database segments of a database across cluster nodes, each data segment having transaction log records that track changes of a transaction, the transaction log records formed into a transaction log stream. The replication component receives multiple transaction log streams from online clones based on the global logical timestamps and command sequence identifiers to create an ordered change history of the changes, merges the multiple log streams into a single change stream, and replicates the changes to a destination in the single change stream according to the change history.

The replication component maintains an original data operation order of the changes when harvesting the multiple log streams, each of which lacks a complete record of all the changes. The replication component coordinates log harvesting with a data virtualization management component of the shared-nothing cluster, so that an offline clone is not switched to online until log harvesting has progressed to the point when online refresh is finished.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
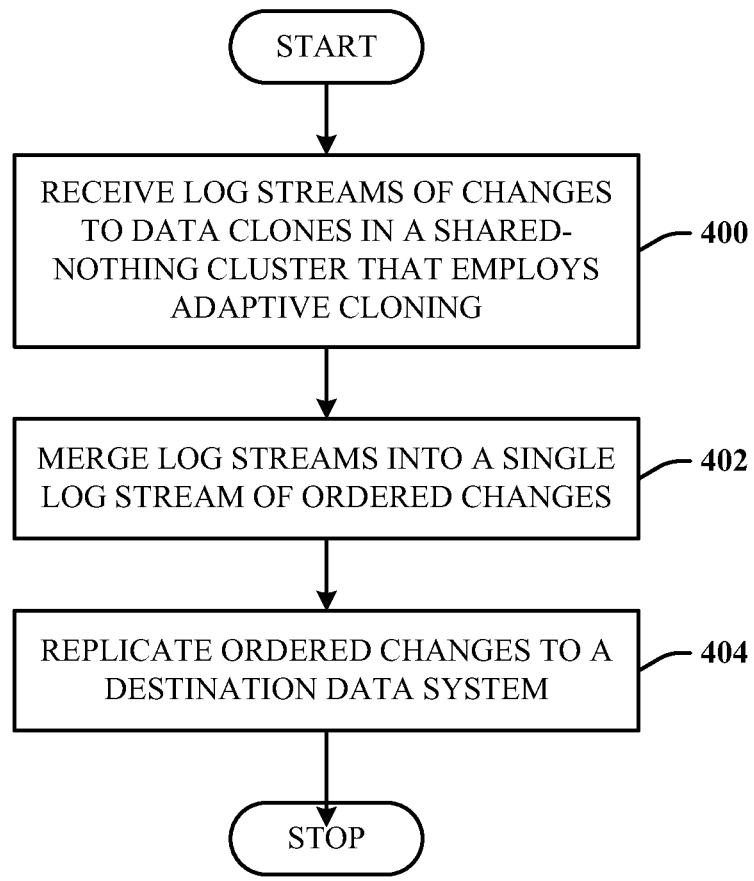
FIG. 4 illustrates a computer-implemented database management method in accordance with the disclosed architecture.

FIG. 4 illustrates a computer-implemented database management method in accordance with the disclosed architecture. At 400, log streams of changes to data clones in a shared-nothing cluster that employs adaptive cloning are received. At 402, the log streams are merged into a single stream of ordered changes. At 404, the ordered changes are replicated to a destination data system.

Figure 5:
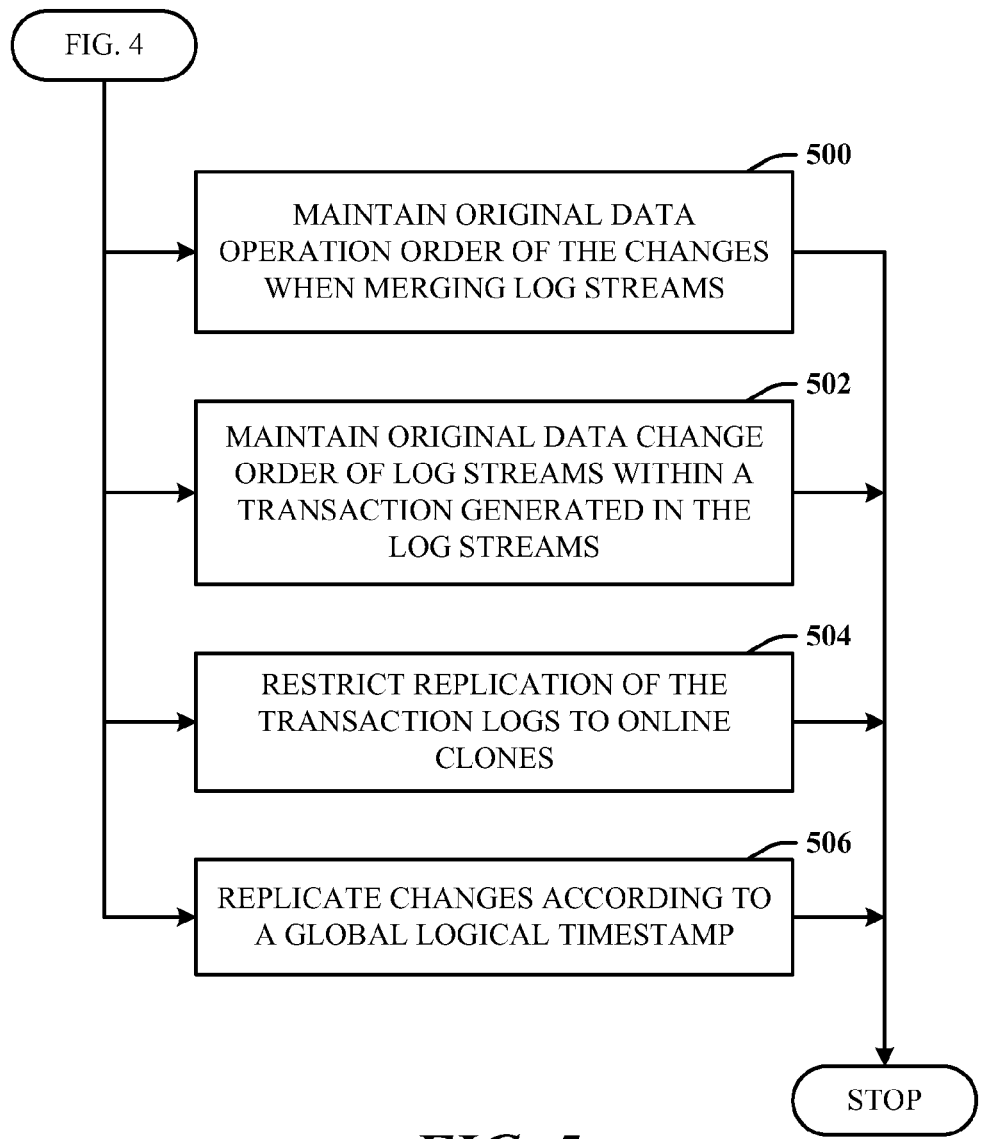
FIG. 5 illustrates further aspects of the method of FIG. 4.

FIG. 5 illustrates further aspects of the method of FIG. 4. At 500, an original data operation order of the changes is maintained when merging the log streams. At 502, an original data change order of the log streams within a transaction generated in the log streams is maintained. At 504, replication of transaction log records is restricted to online clones. At 506, the changes are replicated according to a global logical timestamp.

Figure 6:
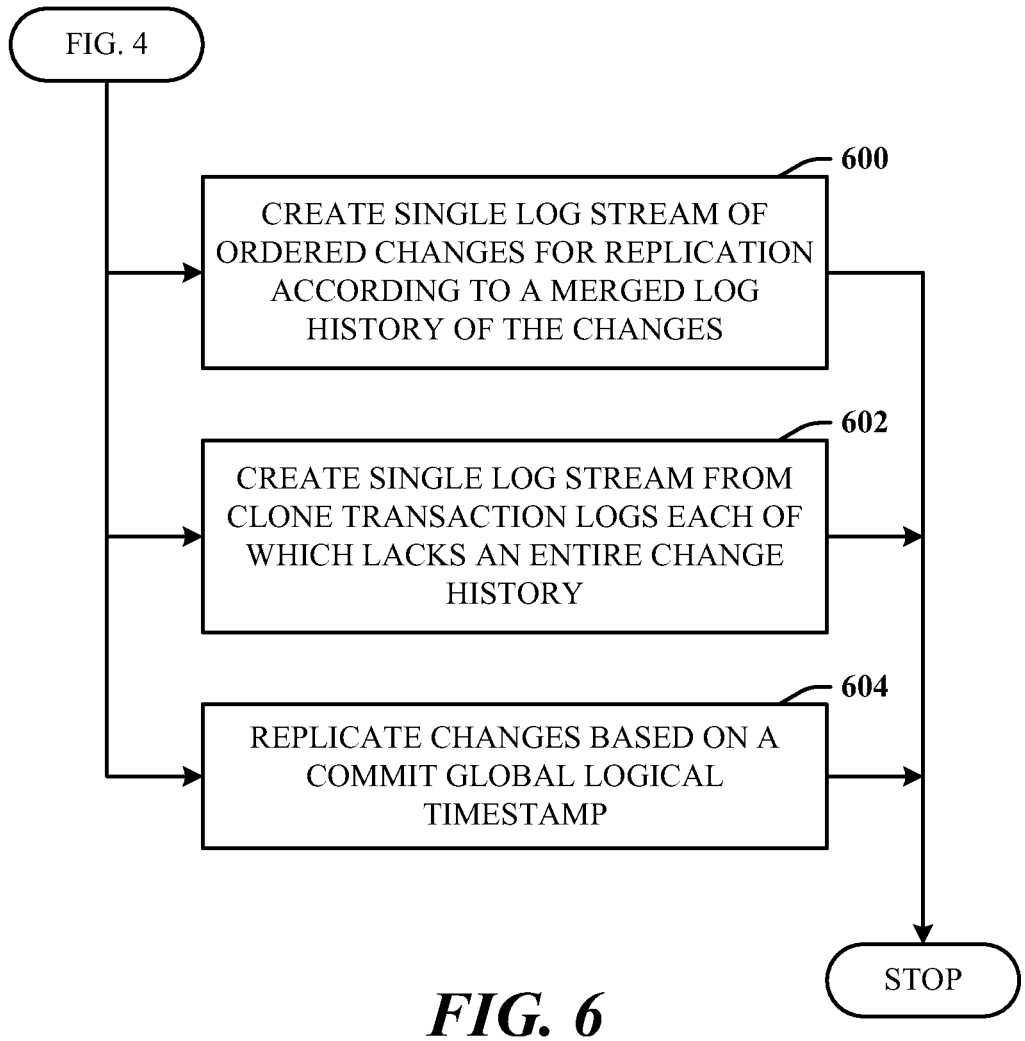
FIG. 6 illustrates further aspects of the method of FIG. 4.

FIG. 6 illustrates further aspects of the method of FIG. 4. At 600, the single log stream of ordered changes is created for replication according to a merged log history of the changes. At 602, the single log stream is created from clone transaction logs each of which lacks an entire change history. At 604, the changes are replicated based on a commit global logical timestamp.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
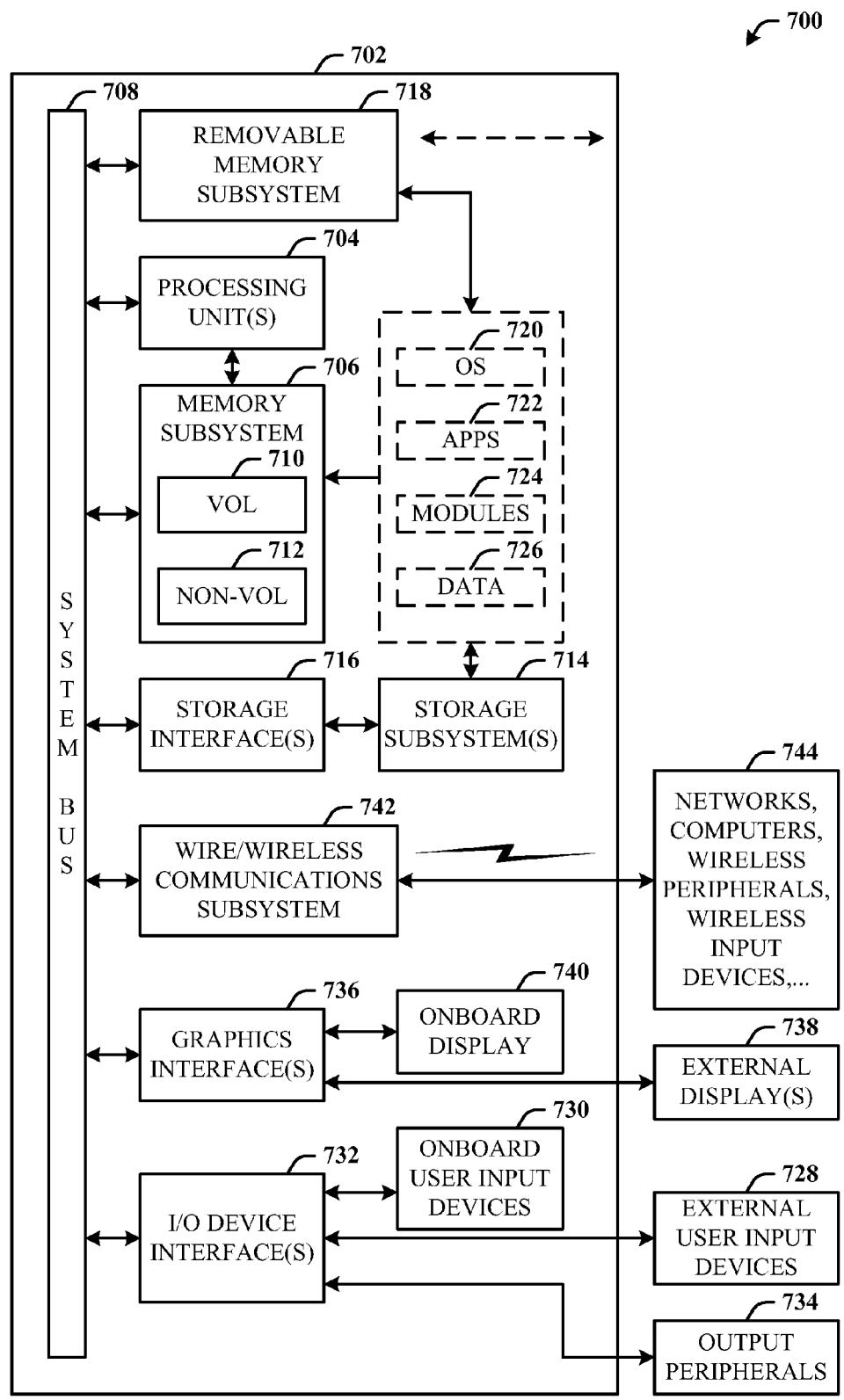
FIG. 7 illustrates a block diagram of a computing system that executes log replication in a shared-nothing cluster with adaptive cloning in accordance with the disclosed architecture.

Referring now to FIG. 7, there is illustrated a block diagram of a computing system 700 that executes log replication in a shared-nothing cluster with adaptive cloning in accordance with the disclosed architecture. In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a computer-readable storage such as a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include computer-readable storage (physical storage media) such as a volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components. The storage subsystem(s) 714 (physical storage media) can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The one or more application programs 722, other program modules 724, and program data 726 can include the entities and components of the system 100 of FIG. 1, the entities and components of the system 200 of FIG. 2, the state and activities in the table 300 of FIG. 3, and the methods represented by the flowcharts of FIGS. 4-6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 702 and includes volatile and non-volatile internal and/or external media that is removable or non-removable. For the computer 702, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented database management system having computer readable media that store executable instructions executed by a processor, comprising:
    a shared-nothing cluster that employs adaptive cloning to store database segments of a database as clones across cluster nodes, for maintaining redundant copies of the database segments within the cluster, each database segment having transaction log records that track changes of a transaction, the transaction log records formed into a transaction log stream, where adaptive cloning comprises activating a secondary clone to become primary when a primary clone becomes unavailable, where the share-nothing cluster does not preserve a user transaction boundary when refreshing a stale clone, wherein if it is determined that a degree of staleness of the stale clone is above a predetermined threshold, the stale clone is rebuilt in its entirety;
    a replication component that receives multiple transaction log streams of a database to create a change history of the changes by coordinating clone state transition with transaction log harvesting to ensure correctness of logical replication, the replication component replicates the changes to a destination data system as a single stream of changes; and
    a microprocessor that executes computer-executable instructions associated with at least one of the shared-nothing cluster or the replication component.

2. The system of claim 1, wherein the replication component maintains an original data operation order of the changes when receiving the multiple transaction log records of different transactions.

3. The system of claim 1, wherein the replication component adheres to an original data change order of transaction log records within a transaction generated in the multiple transaction log streams.

4. The system of claim 1, wherein the replication component receives the multiple transaction log records based on global logical timestamps of commit processes employed in the cluster.

5. The system of claim 1, wherein the replication component creates the change history as a single ordered stream of the changes, the single ordered stream created from the multiple transaction log streams each of which lacks a complete record of all the changes.

6. The system of claim 1, wherein when refreshing the stale clone, the share-nothing cluster does not replay missed updates but instead identifies mismatches in records of the stale clone and updates those records.

7. The system of claim 1, wherein the replication component coordinates log stream handling with a data virtualization management component of the shared-nothing cluster, the replication component harvests the transaction log records from cluster nodes as log streams.

8. A computer-implemented database management system having computer readable media that store executable instructions executed by a processor, comprising:
    a shared-nothing cluster that employs adaptive cloning to store database segments of a database across cluster nodes, for maintaining redundant copies of the database segments as clones within the cluster, each data segment having transaction log records that track changes of a transaction, the transaction log records formed into a transaction log stream, wherein adaptive cloning is implemented such that when a primary clone becomes unavailable, a secondary clone is activated to become a new primary clone, when refreshing the stale clone, the share-nothing cluster does not replay missed updates but instead identifies mismatches in records of the stale clone and updates those records using an outer join between the new primary clone and the stale clone to identify a key of a row of the stale clone that is out-of-date, locking the key on the new primary clone, deleting the key from the stale clone and inserting data of the row associated with the key from the new primary clone into the stale clone;
    a replication component that receives multiple transaction log streams from online clones based on the global logical timestamp to create an ordered change history of the changes, merges the multiple log streams into a single change stream, and replicates the changes to a destination in the single change stream according to the change history; and
    a microprocessor that executes computer-executable instructions associated with at least one of the shared-nothing cluster or the replication component.

9. The system of claim 8, wherein the replication component maintains an original data operation order of the changes when harvesting the multiple log streams.

10. The system of claim 9, wherein an offline clone of the cluster is not switched to online until log harvesting has progressed to a certain point when clone online refresh is finished.

11. The system of claim 8, wherein the single ordered stream is created from the multiple transaction log streams each of which lacks a complete record of all the changes.

12. The system of claim 8, wherein the replication component coordinates log stream receipt with a data virtualization management component of the shared-nothing cluster, the replication component harvests the transaction log records from cluster nodes as log streams.

13. A computer-implemented database management method performed by a computer system executing machine-readable instructions, the method comprising acts of:
    receiving log streams of changes to data clones in a shared-nothing cluster that employs adaptive cloning for maintaining the data clones as redundant copies of database segments within the cluster such that when a primary clone becomes unavailable, a secondary clone is activated to become a new primary clone;

merging the log streams into a single log stream of ordered changes by coordinating clone state transition with log stream harvesting to ensure correctness of logical replication, wherein creating the single log stream from clone transaction logs each of which lacks an entire change history; and replicating the ordered changes to a destination data system, where the share-nothing cluster does not preserve a user transaction boundary when refreshing a stale clone, wherein if it is determined that a degree of staleness of the stale clone is above a predetermined threshold, the stale clone is rebuilt in its entirety.

14. The method of claim 13, further comprising maintaining an original data operation order of the changes when merging the log streams.

15. The method of claim 13, further comprising maintaining an original data change order of the log streams within a transaction generated in the log streams.

16. The method of claim 13, further comprising restricting replication of transaction log records to online clones.

17. The method of claim 13, further comprising replicating the changes according to a global logical timestamp.

18. The method of claim 13, further comprising creating the single log stream of ordered changes for replication according to a merged log history of the changes.

19. The method of claim 13, further comprising replicating the changes based on a commit global logical timestamp.

* * * * *